United States Patent Office 3,532,697
Patented Oct. 6, 1970

3,532,697
(4-OXO-1,2,3-BENZOTRIAZIN-3[4H]-YL)METHYL THIOLSULFONATE ESTERS
Joseph E. Dunbar and John W. Zemba, Midland, Mich., assignors to The Dow Chemical Company, Midland, Mich., a corporation of Delaware
No Drawing. Filed Oct. 11, 1968, Ser. No. 766,961
Int. Cl. C07d 55/08
U.S. Cl. 260—248                    4 Claims

ABSTRACT OF THE DISCLOSURE

The novel compounds represented by the formula

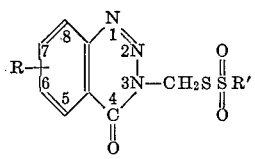

in which R represents hydrogen, halo or lower alkylthio and R' represents lower alkyl, halophenyl, benzyl or halobenzyl. The compounds are useful as insecticides and antimicrobials.

SUMMARY OF THE INVENTION

The present invention is directed to a group of new (4-oxo-1,2,3-benzotriazin-3[4H]-yl)methyl thiolsulfonate esters corresponding to the formula

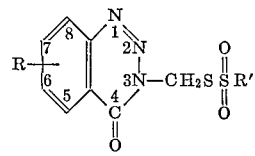

In this and succeeding formulas, R represents hydrogen, halo, or lower alkylthio and R' represents lower alkyl, phenyl, benzyl, halophenyl or halobenzyl. In the present specification and claims, lower alkyl and lower alkylthio represent moieties containing from 1, to 2, to 3, to 4 carbon atoms and halo represents fluoro, chloro, bromo or iodo. Representative lower alkyl and lower alkylthio moieties include methyl, ethyl, propyl, butyl, methylthio, ethylthio, propylthio and butylthio. The compounds of the present invention are crystalline solids. They are of relatively low solubility in water and of relatively higher solubility in common organic solvents such as acetone, methyl ethyl ketone, methanol, ethanol and dimethylformamide. The new compounds are useful as insecticides and antimicrobials.

Representative compounds of the present invention include (6-bromo-4-oxo-1,2,3-benzotriazin-3[4H]-yl)
  methyl methanethiolsulfonate,
(7-iodo-4-oxo-1,2,3-benzotriazin-3[4H]-yl)methyl
  n-butanethiolsulfonate,
(6-n-butylthio-4-oxo-1,2,3-benzotriazin-3[4H]-yl)
  methyl n-propanethiolsulfonate,
(4-oxo-1,2,3-benzotriazin-3[4H]-yl)methyl benzene-
  thiolsulfonate,
(6-bromo-4-oxo-1,2,3-benzotriazin-3[4H]-yl)methyl
  toluenethiolsulfonate,
(7-bromo-4-oxo-1,2,3-benzotriazin-3[4H]-yl)methyl
  p-bromobenzenethiolsulfonate, and
(6-bromo-4-oxo-1,2,3-benzotriazin-3[4H]-yl)methyl
  p-fluorotoluenethiolsulfonate.

Preferred compounds of the present invention comprise those characterized by the foregoing formula wherein R represents chloro, hydrogen, or methylthio and R' represents methyl or p-chlorophenyl.

The compounds of the present invention are prepared by reacting a 3-halomethyl-1,2,3-benzotriazin-4(3H)-one and an alkali metal thiosulfonate salt according to the following reaction:

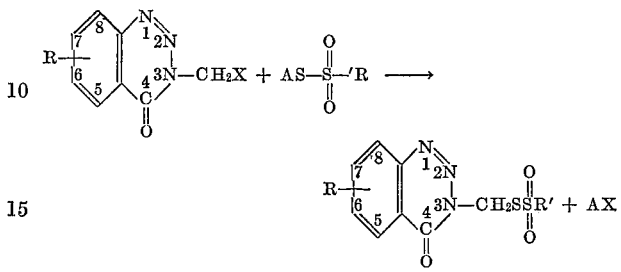

wherein A represents an alkali metal cation such as sodium, potassium or lithium and X represents chloro, bromo or iodo. The reaction is conveniently carried out in an inert organic solvent as reaction medium such as dimethylformamide, sulfolane, ethanol or acetone. The amounts of the reagents to be employed are not critical, some of the desired product being obtained when employing any proportions of the reactants. However, the reaction consumes the reactants in equimolar proportions and good yields are obtained when equimolar proportions of the reactants are employed. The reaction takes place smoothly at a temperature at which alkali metal halide is liberated, conveniently at temperatures of from 70° to 100° C.

In carrying out the reaction, the reactants are mixed and contacted together in any convenient fashion and the resulting mixture maintained for a period of time in the reaction temperature range. Following the reaction, the reaction mixture is processed by conventional procedures to obtain the desired product. In one such conventional procedure, the reaction medium is poured into water, the aqueous phase is decanted, the residue is dissolved in an appropriate solvent such as methylene chloride, chloroform or ether, the resulting solution water-washed, dried, and the product is recovered by evaporation of solvent in vacuo. Crude product is recrystallized from an appropriate solvent such as methanol, ethanol or isopropanol to give crystalline product. It is not necessary that the product be purified in order to be useful in pesticidal or antimicrobial applications.

DESCRIPTION OF THE PREFERRED EMBODIMENTS

The following examples describe completely representative specific embodiments and the best mode contemplated by the inventors of carrying out the invention.

Example 1.—(4-oxo-1,2,3-benzotriazin-3[4H]-yl)
methyl methanethiolsulfonate

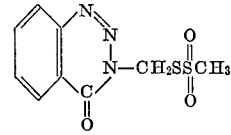

A mixture of 12.7 g. (0.0650 mole) of 3-chloromethyl-1,2,3-benzotriazin-4(3H)-one and 9.8 g. (0.065 mole) of potassium methanethiosulfonate in 75 ml. of dimethylformamide is heated on the steam bath for 1.5 hours and then poured into ice water. The aqueous phase is decanted from the viscous gum crude product and the gum is dissolved in methylene chloride. This solution is washed three times with water and then dried over anhydrous magnesium sulfate. The solution is treated with activated charcoal, filtered, and the solvent removed by evaporation in vacuo, leaving a pale yellow, viscous oil. The oil is crystallized from methanol to give a white solid. Recrystallization from methanol gives the pure (4-oxo-1,2,3-benzotriazin - 3 - [4H] - yl)methyl methanethiolsulfonate as white crystals melting at 62°–63.5° C.

*Analysis.*—Calculated for $C_9H_9N_3O_3S_2$ (percent): C, 39.84; H, 3.34; N, 15.49. Found (percent): C, 39.7; H, 3.52; N, 15.7.

Example 2.—(7-chloro-4-oxo-1,2,3-benzotriazin-3[4H]-yl)methyl methanethiolsulfonate

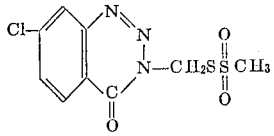

A mixture of 15.6 g. (0.0679 mole) of 7-chloro-3-chloromethyl - 1,2,3 - benzotriazin - 4(3H) - one and 10.0 g. (0.0666 mole) of potassium methanethiosulfonate in 75 ml. of dimethylformamide is heated on the steam bath with stirring for two hours, cooled and poured into ice water. The solid precipitate product is collected on a filter, washed with water and air-dried. Recrystallization from methanol gives the pure (7-chloro-4-oxo-1,2,3-benzotriazin-3[4H]-yl)methyl methanethiolsulfonate as white crystals, melting at 145°–147° C.

*Analysis.*—Calculated for $C_9H_8ClN_3O_3S_2$ (percent): C, 35.35; H, 2.64; N, 13.74. Found (percent): C, 35.3; H, 2.57; N, 13.8.

Example 3.—(6 - chloro-4-oxo-1,2,3-benzotriazin-3[4H]-yl)methyl methanethiolsulfonate

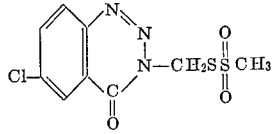

A mixture of 21.5 g. (0.0918 mole) of 6-chloro-3-chloromethyl-1,2,3-benzotriazin-4(3H) - one and 14.0 g. (0.934 mole) of potassium methanethiosulfonate in 100 ml. of dimethylformamide is heated on the steam bath for three hours and then allowed to stand at room temperature for 15 hours. The reaction mixture is poured into ice water and the precipitate collected on a filter and air dried. Recrystallization from benzene gives the pure (6-chloro - 4 - oxo - 1,2,3 - benzotriazin-3[4H]-yl)methyl methanethiolsulfonate as pale yellow crystals, melting at 124°–127° C.

*Analysis.*—Calculated for $C_9H_8ClN_3O_3S_2$ (percent): C, 35.35; H, 2.64; N, 13.74. Found (percent): C, 35.6; H, 2.74; N, 13.8.

Example 4.—(4-oxo-1,2,3 - benzotriazin-3[4H]-yl)methyl p-chlorobenzenethiolsulfonate

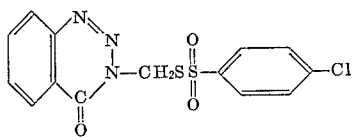

A mixture of 31.5 g. (0.0691 mole) of 3-chloromethyl-1,2,3-benzotriazin-4(3H)-one and 17.1 g. (0.0693 mole) of potassium p-chlorobenzenethiolsulfonate in 75 ml. of dimethylformamide is heated on the steam bath with stirring for two hours and then allowed to stand at room temperature for 15 hours. The mixture is then poured into ice water. The precipitate is collected on a filter, washed with water and air-dried. Recrystallization from benzene gives the pure (4-oxo-1,2,3-benzotriazin-3[4H]-yl)methyl p-chlorobenzenethiolsulfonate as white crystals, melting at 143°–144° C.

*Analysis.*—Calculated for $C_{14}H_{10}ClN_3O_3S_2$ (percent): C, 45.71; H, 2.74; N, 11.42. Found (percent): C, 45.45; H, 2.68; N, 11.6.

Example 5.—(6 - methylthio - 4 - oxo-1,2,3-benzotriazin-3-[4H]-yl)methyl p-chlorobenzenethiolsulfonate

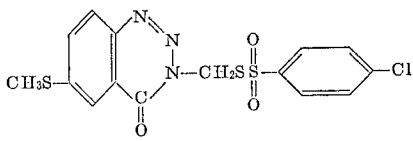

A mixture of 15.3 g. (0.0635 mole) of 3-chloromethyl-6 - methylthio - 1,2,3-benzotriazin-4(3H)-one and 16.5 g. (0.0670 mole) of potassium p-chlorobenzenethiolsulfonate in 75 ml. of dimethylformamide is heated on the steam bath for three hours and allowed to stand at room temperature for 15 hours. The mixture is then poured into ice water and the precipitate collected on a filter, washed with water and air-dried. Recrystallization from benzene gives pure (6-methylthio-4-oxo-1,2,3-benzotriazin-3[4H]-yl)methyl p-chlorobenzenethiolsulfonate as pale yellow crystals, melting at 134°–136° C.

*Analysis.*—Calculated for $C_{15}H_{12}ClN_3O_3S_3$ (percent): C, 43.52; H, 2.92; N, 10.15. Found (percent): C, 43.8; H, 3.19; N, 10.2.

Example 6.—(6-methylthio-4-oxo-1,2,3-benzotriazin-3[4H]-yl)methyl methanethiolsulfonate

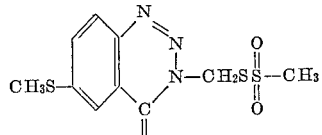

A mixture of 15.3 g. (0.0635 mole) of 3-chloromethyl-6-methylthio-1,2,3-benzotriazin-4(3H) - one and 9.5 g. (0.063 mole) of potassium methanethiosulfonate in 75 ml. of dimethylformamide is heated at 90° to 91° C. for three hours, cooled and poured into ice water. The crude product is collected on a filter, washed with water, air-dried and recrystallized from benzene to give pure (6-methylthio - 4 - oxo-1,2,3-benzotriazin-3[4H]-yl)methyl methanethiolsulfonate as yellow crystals, melting at 148°–151° C.

*Analysis.*—Calculated for $C_{10}H_{11}N_3O_3S_3$ (percent): C, 37.84; H, 3.49; N, 13.24. Found (percent): C, 38.7; H, 3.55; N, 12.98.

The following compounds of the present invention are prepared from the indicated starting materials in accordance with the methods herein described.

(4 - oxo-1,2,3-benzotriazin-3[4H]-yl)methyl n-butanethiosulfonate (molecular weight 313.38) by reacting 3-chloromethyl-1,2,3-benzotriazin-4(3H)-one and potassium n-butanethiosulfonate.

(7 - bromo-4-oxo-1,2,3-benzotriazin - 3[4H]-yl)methyl n-propanethiosulfonate (molecular weight 378.27) by reacting 7-bromo-3-chloromethyl-1,2,3-benzotriazin-4(3H)-one and potassium n-propanethiosulfonate.

(6-isopropylthio - 4 - oxo - 1,2,3-benzotriazin-3[4H]-yl)methyl p - bromobenzenethiolsulfonate (molecular weight 486.42) by reacting 3-chloromethyl-6-n-propylthio-1,2,3-benzotriazin - 4(3H)-one and sodium p-bromobenzenethiosulfonate.

(6 - n - butylthio - 4 - oxo - 1,2,3-benzotriazin-3[4H]-yl)methyl p - toluenethiolsulfonate (molecular weight 423.55) by reacting 3 - chloromethyl-6-n-butylthio-1,2,3-benzotriazin - 4(3H) - one and potassium toluenethiolsulfonate.

(6 - methylthio - 4 - oxo-1,2,3-benzotriazin-3[4H]-yl)methyl p-fluorophenylmethanethiolsulfonate (molecular weight 411.48) by reacting 3-chloromethyl-6-methylthio-1,2,3-benzotriazin-4(3H)-one and potassium p-fluorophenylmethanethiolsulfonate.

The new (4 - oxo - 1,2,3-benzotriazin-3[4H]-yl)methyl thiolsulfonate esters are useful as insecticides and antimicrobials for the control of a variety of insects and microbes such as southern army worm, yellow fever mosquito,

*Trichophyton mentagrophytes, Bacillus subtilis,* Bacterium acid fast, downy mildew and apple scab fungus. For such use, the unmodified esters can be employed. Alternatively, the toxicant compounds can be dispersed on an inert finely divided solid to prepare dust compositions. The dust compositions can be dispersed in water with or without the aid of a wetting or dispersing agent, the resulting aqueous dispersions being useful as sprays. In other procedures, the compounds can be employed as a constituent in oil or solvent compositions, or with or without an emulsifying or dispersing agent in solvent-in-water or water-in-solvent emulsions or dispersions which are useful as sprays, drenches or washes.

The exact concentration of the toxic constituent to be employed in the treating compositions is not critical and may be varied considerably provided an effective amount of the toxicant is supplied, whether on the plant or plant part or in the soil, ink, adhesive, cutting oil, textile, paper, wood or other environment of the organism. Good results are obtained when employing compositions containing insecticidal or antimicrobial concentrations and usually from about 50 to 10,000 parts per million by weight of one or more of the compounds. This is not to suggest that the compounds herein claimed and compositions containing them are equally effective at similar concentrations or against the same insects or fungal or bacterial plant pests. The concentration of toxicant in liquid compositions generally is from about 1–50% by weight. Concentrations up to 95 weight percent often are conveniently employed. Thus, the concentration of the toxicant can be from about 1–10 weight percent. In compositions to be employed as concentrates, the toxicant can be present in a concentration of from 5–98 weight percent.

In representative operations, each of (4-oxo-1,2,3-benzotriazin-3[4H]-yl)methyl methanethiolsulfonate and (4-oxo-1,2,3-benzotriazin-3[4H]-yl)methyl p-chloro benzenethiolsulfonate gives complete kills of *Trichophyton mentagrophytes* when employed in aqueous acetone compositions at a concentration of 1500 parts per million by weight. Additionally, the first-named compound is equally effective against *Bacillus subtilis* at the same concentration in the same compositions, while the second-named compound gives complete control of downy mildew and apple scab fungus when employed in oil-in-water emulsions at the same concentration.

In further operations, each of (6-chloro-4-oxo-1,2,3-benzotriazin-3[4H]-yl)methyl methanethiolsulfonate and (6-methylthiol-4-oxo-1,2,3-benzotriazin-3[4H] - yl)methyl methanethiolsulfonate gives complete kills of the southern army worm when employed in oil-in-water emulsions at a concentration of 2500 parts per million by weight. The second-named compound is also bactericidal to *Bacillus subtilis* and Bacterium acid fast when employed in aqueous acetone compositions at a concentration of 500 parts per million.

The 3-halomethyl-1,2,3-benzotriazine-4(3H)-one compounds to be employed as starting materials in the preparation of the products of the present invention are prepared by the reaction of the corresponding (hydroxymethyl)benzotriazinone compounds:

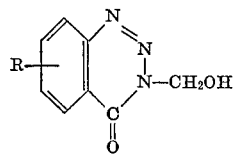

with a halogenating agent such as hydrochloric acid, hydrobromic acid, hydriodic acid, phosphorus pentachloride, phosphorus tribromide, or thionyl chloride. The reaction is conveniently carried out in an inert liquid reaction medium, such as, for example, hydrocarbons, chlorinated hydrocarbons, or ketones. The reaction consumes the reactants in amounts representing equimolecular proportions, but better yields are usually obtained by employing an excess of the halogenating agent, such as from one to ten molecular proportions of halogenating agent per molecular proportion of the (hydroxymethyl)benzotriazinone compound.

The reaction goes forward readily under a wide range of temperatures, such as from 20° C. to the reflux temperature of the reaction medium. The reaction results in the preparation of the desired (halomethyl)benzotriazinone compound, by-products varying in accordance with the identity of the halogenating agent.

In carrying out the reaction, the reactants are contacted with one another in liquid reaction medium. The reaction goes forward almost immediately upon the contacting of the reactants, but higher yields are often obtained by maintaining the reaction mixture for a period of time following completion of the contacting of the reactants. By-products are removed in conventional procedures, leaving a reaction medium containing the desired (halomethyl) benzotriazinone starting material. It can be separated from the reaction medium, and, if desired, purified, in conventional procedures.

The (hydroxymethyl)benzotriazinone compounds which are used in the preparation of the corresponding (halomethyl)benzotriazinone starting materials, wherein R represents hydrogen or halo, are prepared by a two-step reaction. This reaction comprises diazotization of an anthranilamide to obtain a 1,2,3-benzotriazin-4(3H)-one which is then treated with formaldehyde to obtain the desired (hydroxymethyl)benzotriazinone compounds, in accordance with the following equation:

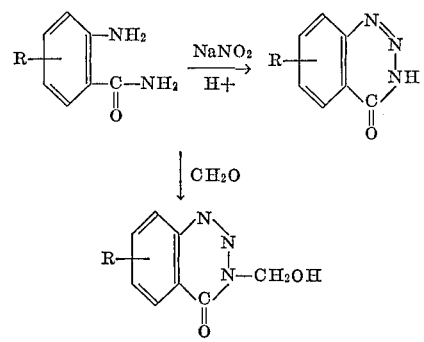

The diazotization and the treatment with formaldehyde are carried out in standard procedures.

The (halomethyl)benzotriazinone reactants wherein R is lower alkylthio are similarly prepared starting with thiocyano-substituted anthranilamide. The thiocyano substitution is achieved by reacting anthranilamide with an alkali metal or ammonium thiocyanate in the presence of chlorine or bromine. The reaction is carried out in the presence of an inert solvent such as a lower alkanol. The reaction consumes the reactants in equimolar proportions. However, to obtain good yields, proportions of about 2.5 moles of alkali metal or ammonium thiocyanate, one mole of anthranilamide and one mole of halogen are used. The reaction goes forward readily under an alkali metal or ammonium halide-liberating temperature, such as from 0°–+10° C. The reaction results in the preparation of the desired thiocyanoanthranilamide.

In carrying out the reaction, the anthranilamide and thiocyanate are advantageously suspended in a lower alkanol, the suspension is cooled advantageously to 0°–10° C., and molecular chlorine or bromine is gradually added so that the exotherm does not increase the reaction temperature above 10° C. Upon completion of the addition of the halogen, the reaction mixture is poured into ice water. Thiocyanoanthranilamide precipitates as the thiocyanic acid salt. Product thiocyanoanthranilamide is liberated from the thiocyanic acid by adding sodium carbonate or equivalent base to a pH of about 7 to 8, and filtering.

The lower alkylthio-substituted anthranilamide is prepared by reacting a lower alkyl halide with the thiocyanoanthranilamide in the presence of a base. The reaction is conveniently carried out in a lower alkanol having the same number of carbon atoms as the lower alkyl halide reactant. The reaction consumes the reactants in equimolar proportions, and such proportions are preferred. The reaction goes forward at a sodium cyanide liberating temperature, whereby product (alkythio)anthranilamide is formed. Advantageously, the reaction is carried out at the boiling temperature.

In carrying out the reaction, the reactants are contacted with one another while suspended in the reaction medium, and aqueous sodium hydroxide or equivalent base is added dropwise thereto. After reaction, by-product inorganic salts are removed by conventional procedures leaving a reaction medium containing the desired (alkylthio)anthranilamide. It is separated and purified in a conventional manner.

In a representative procedure, one mole thiocyanoanthranilamide and one mole of methyl chloride are suspended in methanol. Two molar proportions of aqueous sodium hydroxide are added thereto dropwise, and the reaction medium is maintained at the boiling temperature for about thirty minutes. The reaction mixture is then evaporated to dryness, taken up in methylene chloride, the methylene chloride solution washed with water and then dried. The methylene chloride solution is then evaporated to dryness and crystalline product 4-(methylthio) anthranilamide is recovered.

What is claimed:
1. A compound corresponding to the formula

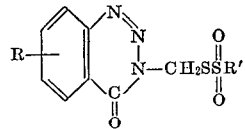

in which R represents hydrogen, halo, or lower alkylthio and R' represents lower alkyl, phenyl, halophenyl, benzyl or halobenzyl.

2. The compound of claim 1 wherein R is hydrogen, chloro or methylthio and R' is methyl.

3. The compound of claim 1 wherein R is methylthio and R' is methyl or p-chlorophenyl.

4. The compound of claim 1 wherein R is chloro or methylthio and R' is methyl.

References Cited

UNITED STATES PATENTS

| | | | |
|---|---|---|---|
| 3,294,631 | 12/1966 | Lorenz et al. | 260—248 XR |
| 3,316,262 | 4/1967 | Hasspacher et al. | 260—248 |

HENRY R. JILES, Primary Examiner

J. M. FORD, Assistant Examiner

U.S. Cl. X.R.

260—558, 999